Jan. 30, 1968 C. H. BOYD ETAL 3,366,235

COMPONENT SORTING APPARATUS

Filed March 23, 1966 6 Sheets-Sheet 1

INVENTORS,
C.H. BOYD
W.W. HALL

BY J.M. Presson

ATTORNEY

COMPONENT SORTING APPARATUS

Filed March 23, 1966 6 Sheets-Sheet 3

United States Patent Office 3,366,235
Patented Jan. 30, 1968

3,366,235
COMPONENT SORTING APPARATUS

Charles H. Boyd, Winston-Salem, N.C., and William W. Hall, Parsippany, N.J., assignors to Western Electric Company, Incorporated, New York, N.Y., a corporation of New York Filed Mar. 23, 1966, Ser. No. 536,785
9 Claims. (Cl. 209—74)

This invention relates to apparatus for sorting articles in accordance with the measured value of one or more preselected article parameters, and more particularly this invention relates to a rotatable and pivotal member which is operable to selectively remove certain electrical components from a component carrier in accordance with the measured value of at least one prescribed component parameter.

There is a current and widespread use of electronic component modules in the assembly of electronic equipment. Each of these component modules typically embodies several electrical or electronic components of the same type, as well as combinations of these components. These components may be inserted or otherwise mounted on a single component holder which can be handled more easily and inserted into, or removed from the equipment assembly.

Before the component modules may be incorporated in electronic equipment, the individual components must be tested to ascertain whether the value of a selected parameter of the associated component is acceptable or unacceptable. The information as to whether one of the components is acceptable or unacceptable is typically provided by a test set that is suitably designed to compare the measured parameter with predetermined acceptable limit values of that parameter. Such test sets are, of course, well known to those working in this art. Although the test set is capable of ascertaining the acceptability or unacceptability of a plurality of components and is capable of producing corresponding accept or reject output signals, some means that is responsive to the output signals of the test set must be provided to selectively remove from the component holder those components that are unacceptable, while leaving the acceptable components in the holder. It will be understood however, that it is not our intention to claim in the instant application novelty in the broad concept of sorting articles on the basis of the acceptability or unacceptability of each article as determined by a suitably designed test set. Copending U.S. application, Ser. No. 282,532, filed May 20, 1963, now U.S. Patent No. 3,240,333, and assigned to the Western Electric Co., Inc., for example, discloses this general concept. The system disclosed in the above-identified patent application employs a plurality of solenoids that are energized by signals from a test set to individually and selectively operate counter-weighted jaws. The jaws associated with solenoids energized by test set signals, operate to withdraw the unacceptable components from the component holder, while the jaws associated with unenergized solenoids release their grip on the acceptable components.

The testing and sorting system of the present invention constitutes an improvement of the system disclosed in the above-disclosed patent application in that the present invention utilizes a single mechanical selector which may be positively operated to selectively drive discrete locking elements so that the elements selectively release those jaws or contacts associated with acceptable components. The principal advantage of the single selector with its cooperating elements over the aforementioned solenoid-operated sorting system has been found to be that of higher operating reliability. Further, as a reading of the following specification will bear out, the selector disclosed by the present invention has possible utility in other types of systems and facilities which may be unrelated to the art of component sorting.

Broadly, it is an object of this invention to provide a system for sorting components on the basis of the measured value of one or more component parameters which utilizes a new and improved mechanism to effect the component sorting operation.

More specifically, an object of this invention is to provide a new and improved mechanical selector for selectively engaging discrete, movable component clamping elements to release components clamped by the elements that are found to be acceptable.

An additional object of this invention is to provide a mechanical selector that is incrementally rotatable and selectively pivotal to positions of engagement with discrete component clamping devices so as to sort components that are clamped by the component clamping devices in accordance with the ascertained value of at least one preselected component parameter.

With these and other objects in view, the present invention relates generally to a component sorting system utilizing a mechanical selector that is mounted for rotary and pivotal movements about parallel axes. The selector has pin-like members extending therefrom that are arranged to selectively drive individual component clamping elements to release these components that are determined to be acceptable when the mechanism undergoes boh pivotal and rotational displacements.

More particularly, the instant invention relates to an apparatus for sorting a plurality of electrical components mounted on a component holder wherein at least one terminal of each component is selectively gripped and released by an associated terminal clamping element operating under the control of an associated slidable interposer. Each terminal clamping element is movable toward and away from an individual associated component and also functions to electrically connect the associated component to an input terminal of a test set. The test set is designed to measure at least one preselected parameter of each component and to generate an accept output signal if the measured parameter value is acceptable.

A drum-like selector is mounted for rotational and pivotal movements about parallel, spaced-apart axes and has an array of pins projecting therefrom which are oriented on the selector to engage and move the interposers only when the selector is pivoted and then rotated. The selector is operatively connected to the test set and operates upon the receipt of an accept output signal therefrom to pivot and rotate so that one of the selector pins engages the interposer that is associated with the tested component that is found to be acceptable. If the tested component is unacceptable, the selector is only rotated and no engagement occurs between a selector pin and its associated interposer. Consequently, the associated terminal clamping element remains in gripping relationship with the associated tested and unacceptable component terminal. After the testing of all the components is completed, the terminal clamping elements are moved from the components, the unreleased elements withdrawing their associated unacceptable components from the component holder as they are so moved. The acceptable components associated with the previously released elements will not be withdrawn from the component holder during this movement of the elements.

Other objects and advantages of the invention will become apparent by reference to the following detailed description and the accompanying drawings, in which.

Figures 1, 2:
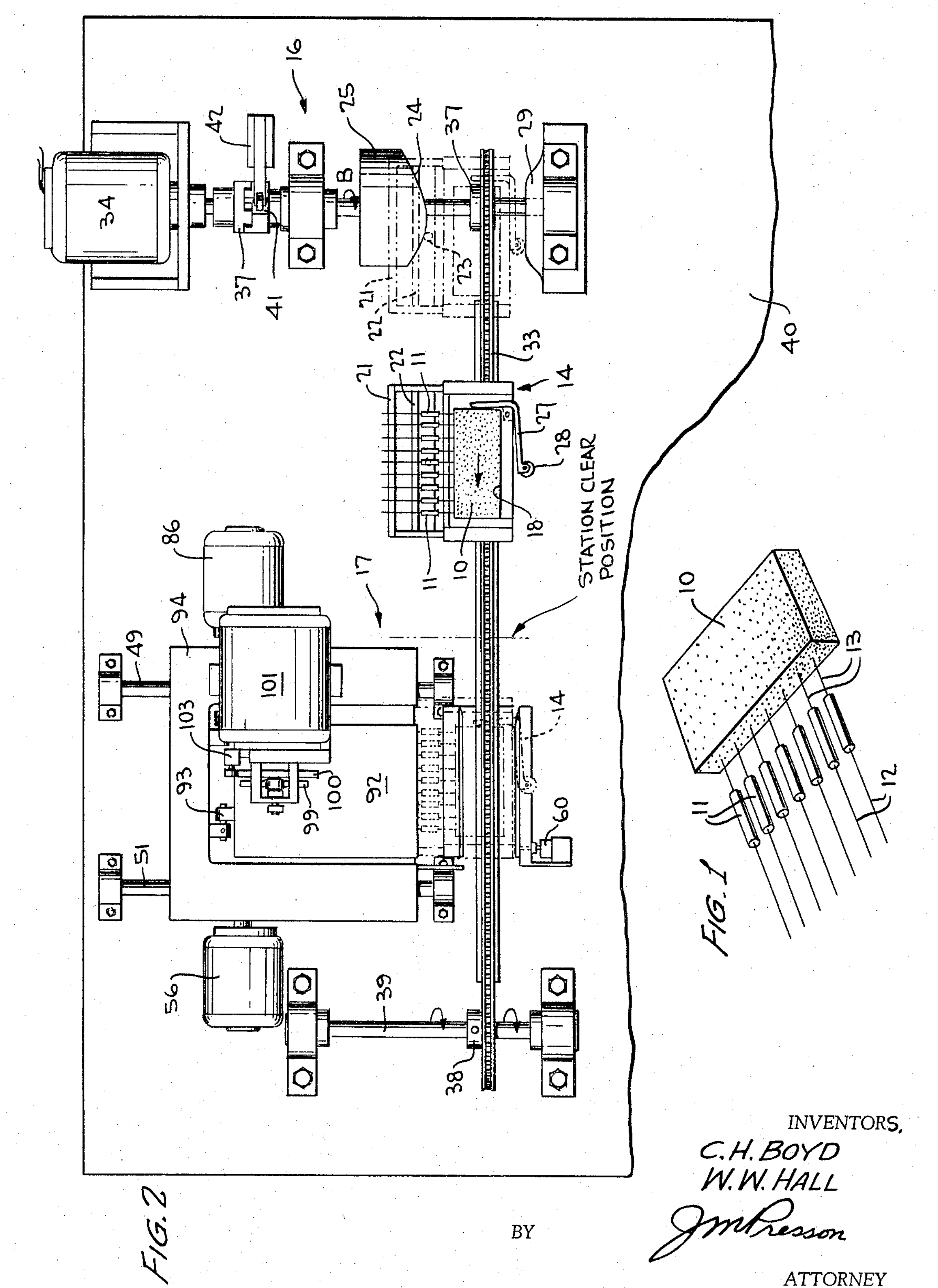
FIG. 1 is a perspective view of electrical components removably mounted in a penetrable plastic block.
FIG. 2 is a plan view of an assorting apparatus embodying the principal features of the present invention and showing conveying facilities for moving a penetrable block to a position adjacent a testing and assorting station.

Referring to FIG. 1, a foam plastic block or holder 10 has a plurality of components 11 removably mounted therein. Each of the components has axial leads 12 and 13. Lead 13 is inserted into the plastic block 10 to support one end of each component 11. The cantilevered components 11 are typically equispaced from one another and may constitute deposited carbon resistors, capacitors, or any other devices or components having measurable parameters or characteristics. The foam block 10 is formed typically of a cellular plastic that is readily penetrable by a lead 13.

As shown in FIG. 2, blocks 10 containing components 11 mounted therein are manually loaded in carriers 14 that are sequentially advanced from a loading station 16 to a testing and sorting station 17 by a conveyor system.

Figure 10:
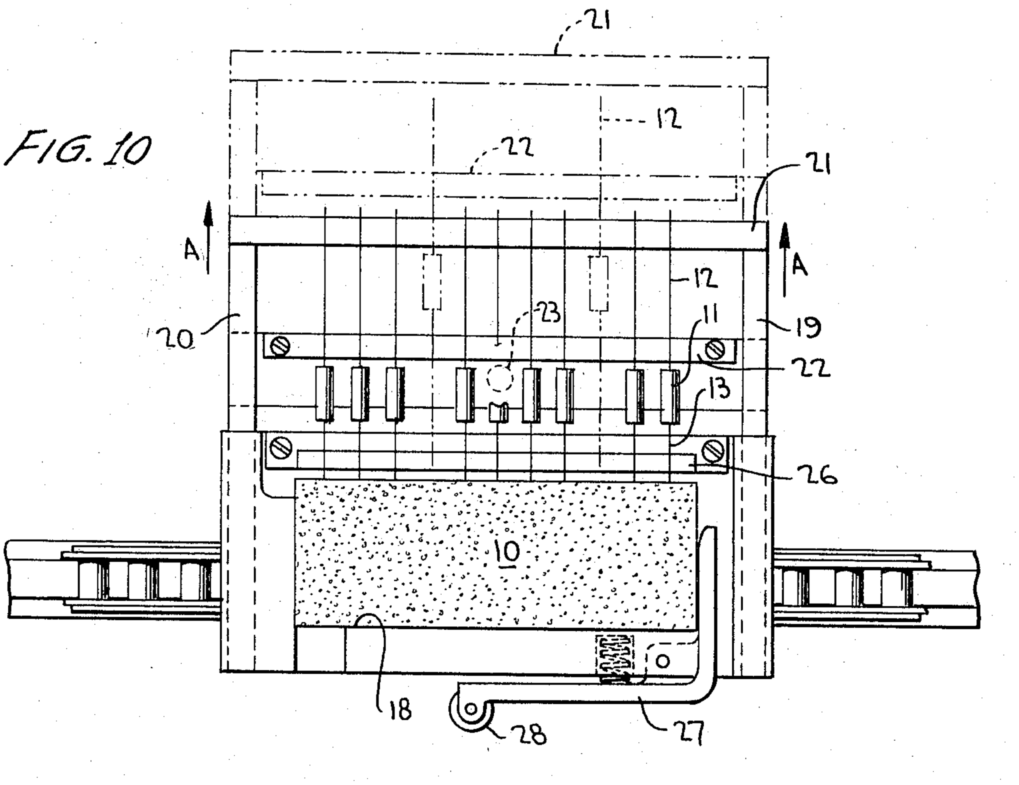
FIG. 10 is a detailed plan view showing a carrier having a block mounted therein in which the component leads are supported by a movably mounted comb structure and also an alternate position of the comb structure showing it in an extended position.

As shown in FIGS. 2 and 10, each carrier 14 is provided with a nest 18 for receiving the block 10. The carrier 14 is provided with a pair of slidably mounted rods 19 and 20 providing fixed support for a front comb 21 and a rear comb 22. The rods 19 and 20, FIG. 10, are movable in the directions of arrows A from the solid line to the dotted line position, and from the dotted line to the solid line position. The comb assembly comprising the rods 19 and 20 and the front and rear combs 21 and 22 has affixed thereto a vertically depending pin 23. The pin 23, FIG. 2, contacts a camming edge 24 of a stationary and generally cylindrical reset cam 25 mounted in the loading station 16 when the carrier 14 is advanced into the station 16 as indicated by the arrow B. The movement of pin 23 along camming edge 24 of the cam 25 in the direction of arrow B, FIG. 2, drives the comb assembly and thus the rods 19 and 20 from the previously extended or dotted line position depicted in FIG. 10, to the reset or solid line position. As will be described subsequently, the pin 23 is also movable to extend the comb assembly.

The carrier 14, FIG. 10, has a transverse rubber pad 26 affixed thereto. When a block 10 is loaded in a carrier 14, the leads 13 reset upon the pad 26 and the leads 12 fit within notches formed in the combs 21 and 22. A spring-loaded lever 27 is pivotally mounted on the carrier 14 and serves to hold the block 10 within the nest 18. The spring-loaded lever 27 has a cam roller 28 mounted on the other end thereof.

When a carrier 14 is moved into the loading station 16, the roller 28 contacts and rides against a cam 29 of generally frustoconical shape that is mounted stationary in the station 16. The cam 29 serves to pivot the roller 28 and thus the lever 27 to permit the manual insertion of the block 10 into the nest 18.

Each carrier 14 is affixed to a continuous conveyor or link chain 33 which conveys the carriers 14 from the loading station 16 to the testing and sorting station 17. The chain 33, FIG. 2, is driven by chain drive motor 34 through a coupling 36 and a drive sprocket 37, to index around an idler sprocket 38 that is fixed on a rotatable shaft 39 mounted adjacent the left end of the apparatus. The motor 34 and the sprockets 37 and 38 are fixedly mounted on a horizontal supporting base 40 and are elevated above the horizontal plane of the base 40 to permit the translation of the carrier 14 into and out of the stations 16 and 17. The carrier 14 moves from the stations 16 and 17, and more specifically to the position indicated by a vertical phantom line in FIG. 2 and designated STATION CLEAR.

When the left edge of the carrier 14 reaches the STATION CLEAR position, a notch 41 formed in one segment of the coupling 36 will accommodate the operating arm 42*a* of a microswitch 43 which normally rides against the peripheral surface of the coupling 36. For reasons that will become evident subsequently, when the operating arm 42*a* of the microswitch 43 drops into the notch 41, the microswitch 43 de-energizes the chain driving motor 34, stopping further translation of the chain 33.

Figure 3:
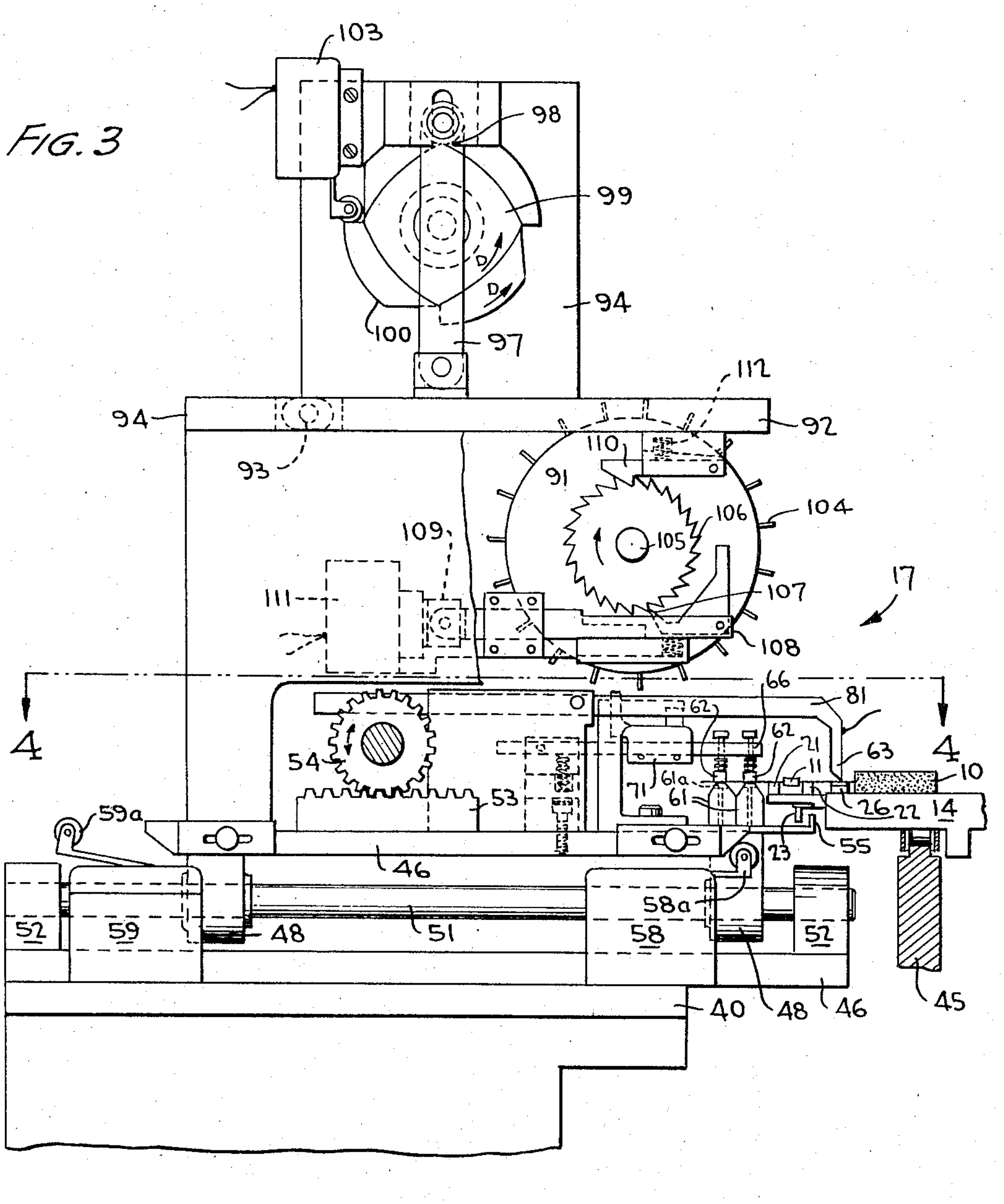
FIG. 3 is a side view of the testing and assorting station showing a carriage in a forward position with clamping mechanisms gripping the components mounted in the block.

FIG. 3 shows a loaded carrier 14 which has been indexed from the STATION CLEAR position into the testing and sorting station 17. The stationary support member 45 provides a vertical support for the links of the chain 33 affixed to the carrier 14 that is in the station 17. The station 17 includes a carriage 46 of U-shaped cross section that is mounted for reciprocative movement on the base 40. The carriage 46 in turn includes depending linear bearings 48 that ride on parallel guide rod 49 and 51, FIG. 2, mounted in supports 52 fixed to base 40. A rack 53 is mounted on the carriage 46 and is engaged by a pinion 54 driven by a reversible motor 56, FIG. 4, that is mounted stationary on the base 40. As best seen in FIG. 3, a substantially L-shaped rod or plate 55 may be formed integral with the carriage 46 and extends outward from the forwardmost edge of the carriage 46 to a position intermediate the pin 23 and the carrier 14. With the carrier 14 in the station 17, the upright leg of the rod 55 will be in a position to engage the pin 23 upon rearward movement of the carriage 46 and extend the comb assembly.

A limit switch 58, FIGS. 3 and 12, is affixed to the base 40 and has an operating arm 58*a* that is actuated to open the switch 58 and de-energize the motor 56 when the carriage moves to the illustrated forward position. A limit switch 59 is also affixed to the frame 47 and has an operating arm 59*a* that is actuated to open the switch 59 and de-energize the motor 56 when the carriage 46 moves to a rearward position.

As will be described in greater detail subsequently, the carriage 46 is driven to the forward position illustrated in FIG. 3 during the interval when the loaded carrier 14, FIG. 2, is held in the STATION CLEAR position. Further, the actuation of the limit switch 58 by the forward displacement of the carriage 46 operates to re-energize the chain drive motor 34 causing the chain 33 to index the loaded carrier 14 from the STATION CLEAR position into station 17.

A limit switch 60, FIG. 2, is mounted stationary in the station 17 adjacent the chain 33 and is actuated by the movement of the carrier 14 into station 17. When the limit switch 60 is actuated, it operates through circuitry, which is disclosed in detail subsequently, to de-energize the chain drive motor 34 and to again stop the translation of the chain 33.

Referring again to FIG. 3, when the carriage 46 is driven to the forward position, each lead 12 is gripped for a predetermined interval between a fixed lead support bar 61 and a vertically movable pin 62. The ends of the pins 62 that press against the leads 12 are composed of an electrical insulative material, such as nylon. Individual contact studs 61*a* are mounted in the bars 61 flush with the upper surface of these bars. The studs 61*a* in one of the bars 61 are alternately positioned relative to the studs 61*a* in the other bar 61 and each stud 61*a* is in vertical alignment with a pin 62. The bars 61 are composed of an electrical insulative material and the studs 61*a* make electrical contact with the leads 12 when the pins 62 press these leads against the studs 61*a*. Similarly, each lead 13 is periodically gripped between a movable single contact bar 63 that is suitably insulated from the apparatus, and the rear comb 22, to complete a circuit, FIG. 11, between the two terminals of each component 11 and the internal testing circuitry (not shown) of an electrical test set 102. The test set 102 is constructed of commercially available units and may, for example, be designed to test the components 11 for continuity between leads 12 and 13 for shorts or for values of resistance or impedance depending upon the nature of the components 11.

Figure 6:
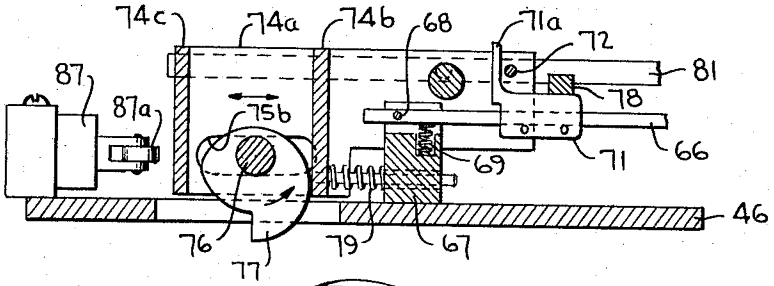
FIG. 6 is a detail cross-sectional view taken on line 6—6 of FIG. 4 showing a cam for reciprocating a release and reset frame to slide a plurality of members movably mounted on a plurality of levers.

The pins 62 are mounted for vertical movement in a plurality of parallel equispaced levers 66 that are pivotally connected to a common mounting bar 67, FIG. 6, by a single pivot pin 68. The mounting bar 67 is suitably secured to the carriage 46. Each lever 66 is biased by a spring 69, each spring 69 thereby urging each lever 66 and pin 62 away from the fixed bars 61. The number of levers 66 and pins 62 is at least as large as the number of components 11. As may be seen in FIGS. 3 and 8, the individual pins 62 are movable vertically in the levers 66 and are urged downward toward the leads 12 by individual coil springs 70.

Figure 4:
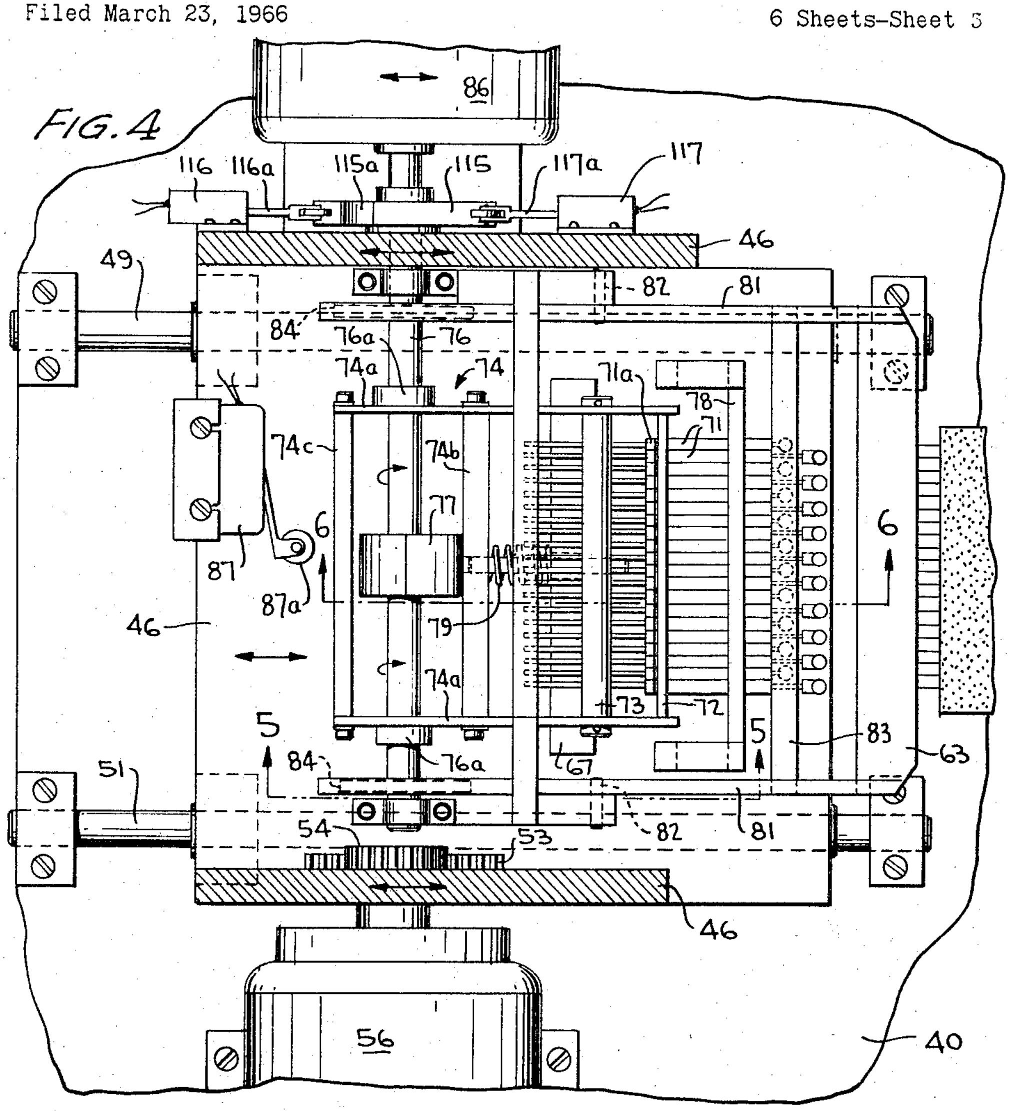
FIG. 4 is a cross-sectional view taken on line 4—4 of FIG. 3 showing driving mechanisms for reciprocating the carriage and for moving the clamping mechanisms to grip and release the components.

It will be noted in FIG. 4 that the length of the levers 66 vary to facilitate the alternate staggering of the pins 62 in order to accommodate a maximum number of components during each cycle of operation. As mentioned previously, successive contact studs 61*a* are also alternately staggered so as to be in vertical alignment with the individual pins 62.

Figure 5:
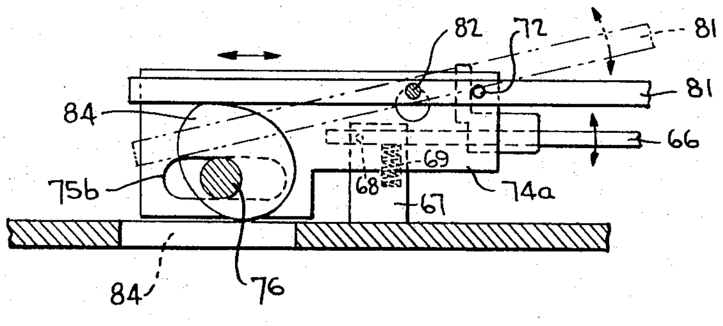
FIG. 5 is a detail cross-sectional view taken on line 5—5 of FIG. 4 showing a cam for engaging and pivoting a common contact bar frame.

As shown in FIGS. 4 and 6, a plurality of generally L-shaped interposers or members 71, equal in number to the number of levers 66, are slidably mounted on the levers 66. Each of the interposers 71 has an upwardly projecting leg or extension 71*a*. A transverse interposer release bar 72 and a transverse interposer reset bar 73 are fixedly mounted in side plates 74*a* that partially comprise a reciprocative frame 74 and the extensions 71*a* of the interposers 71 extend upward between the bars 72 and 73. The bars 72 and 73 alternately engage and slide the interposers 71 rearwardly and forwardly, respectively, on the levers 66 as the frame 74 reciprocates rearwardly and forwardly. The frame 74 includes, in addition to the two side plates 74*a*, forward and rearward transverse camming plates 74*b* and 74*c*, respectively. Two transversely aligned elongated slots 75*a*, FIGS. 5 and 6, are formed in the side plates 74*a*. The slots 75*a* permit horizontal reciprocative movement of the frame 74 relative to a drive shaft 76. The shaft 76 is driven by a motor 86 that is mounted on the carriage 46 for reciprocative movement therewith. A pair of collars 76*a* are fixed to the shaft 76, the diameter of the collars 76*a* being greater than the width of the slots 75*a*. The collars 76*a* serve to limit transverse displacement of the frame 74 during reciprocative movement thereof.

A cam 77 is fixed to the shaft 76, and is best seen in FIG. 6, the cam 77 is designed to periodically contact and impart horizontal reciprocative movement to the camming plates 74*b* and 74*c*, and thus to the frame 74 during the rotation of the shaft 76. A coil spring 79 has one end thereof abutting the mounting 67 and the opposite end abutting the plate 74*b*, thereby urging the plate 74*b* into contact with the contoured periphery of the cam 77.

With reference to FIG. 6, the interposer release bar 72 and the interposer reset bar 73 are positioned to overlie the levers 66 and straddle the interposer extensions 71*a*. A single, transverse hold-down bar 78 is fixedly mounted to the carriage 46. The bar 78 transversely overlies the levers 66 and bears against the interposers 71 after the interposers are slid under the bar 78 by the reset bar 73. With the interposers 71 between the hold-down bar 78 and the levers 66, the contact pins 62 are forced down and held firmly in electrical contact with the leads 12, FIG. 8.

Referring to FIGS. 3, 4, and 5, the common contact bar 63 is mounted on a frame 81 that is pivotally mounted by stud shafts 82 on the carriage 46. The contact bar 63 is preferably electrically insulated from the frame 81 and is designed to make electrical contact with the leads 13 of the components 11. The frame 81 comprises a cross member 83 that transversely overlies the levers 66 for engaging and pivoting the levers 66 downward. The springs 69, FIG. 5, urge the levers 66 against the cross member 83 to bias the frame 81 against spaced-apart and essentially similarly shaped cams 84. The cams 84 are also affixed to the shaft 76 and consequently are rotated when the motor 86 is energized.

Assuming that the free end of the frame 81 is initially in a raised or inclined position as illustrated by the dotted lines in FIG. 5, the lobes on the cams 84 are rotated through the shaft 76 and by the rotation of the motor 86 to pivot the free end of the raised frame 81 downwardly, moving the cross member 83 into engagement with the upwardly inclined levers 66 in the process. Since the levers 66 mount the individual pins 62, the pins 62 are driven down and force the leads 12 into electrical contact with associated studs 61*a*. The common contact bar 63 is also moved downward and into electrical contact with the leads 13. The cam 77, FIG. 4, by virtue of its connection to the shaft 76, simultaneously drives the frame 74 forward. The bar 72 moves out of engagement with the interposer extensions when the frame 74 moves forward. The reset bar 73 follows to drive the interposers through their extensions 71*a* between the stationary hold-down bar 78 and the levers 66, and thus sets the pins 62 firmly against the leads 12. The cams 84 are designed to hold the contact bar 63 into firm electrical contact with the leads 13 during this period. The further rotation of the cam 77 by the motor 86 allows the spring 79, FIG. 6, to expand and drive the frame 74 back to a position that is intermediate the extreme forward and rearward frame positions moving the reset bar 73 from its position of contact with the interposers 71. The bar 72 is not displaced rearwardly far enough at this time to engage and drive the interposers 71 from under the bar 78 and thus the individual equispaced levers 66 are set by the individual interposers 71. With the desired electrical connection effected between the leads 12 and the studs 61*a* and between the leads 13 and the contact bar 63, the test set 102, FIG. 1, may now measure, for instance, the resistance values of the components 11.

A limit switch 87 mounted on the rearward end of the carriage 46 has an operating arm 87*a* that is depressed by the frame 74 upon rearward movement thereof. For reasons that will become evident subsequently, the motor 86 is de-energized when the operating arm 87*a* is depressed by the rearwardly moving frame 74.

Figure 7:
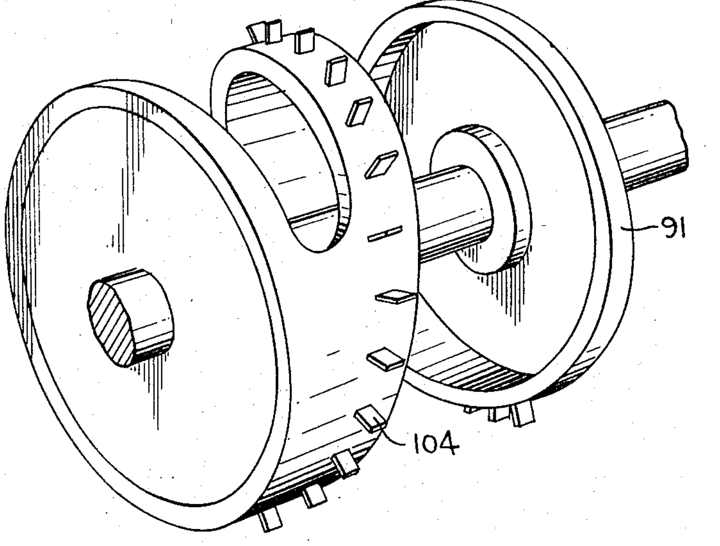
FIG. 7 is a perspective view showing a selector drum having a plurality of pins extending radially therefrom for engaging corresponding movable members.

Referring to FIGS. 3 and 7, and considering the facilities for permutably or selectively moving and positioning the equispaced interposers 71, a selector drum 91 is rotatably mounted on a pivotal frame 92 that is hinged on a pintle 93. The pintle 93 extends from a support frame 94 which in turn is fixedly secured to the upper edges of the vertical sides of the carriage 46.

The drum 91, which is preferably of helical configuration for reasons that will be evident subsequently, and the frame 92 are held in an elevated position by a link 97 having a cam follower roller 98 that rides on the periphery of a cam 99. Four lobes 100 of essentially identical shape extend radially from the periphery of the cam 99. The cam 99 is driven by a motor 101, FIG. 2, in the direction indicated by the arrow D, FIG. 3, to cyclically lower and raise the cam follower roller 98 and the link 97.

Figure 11:
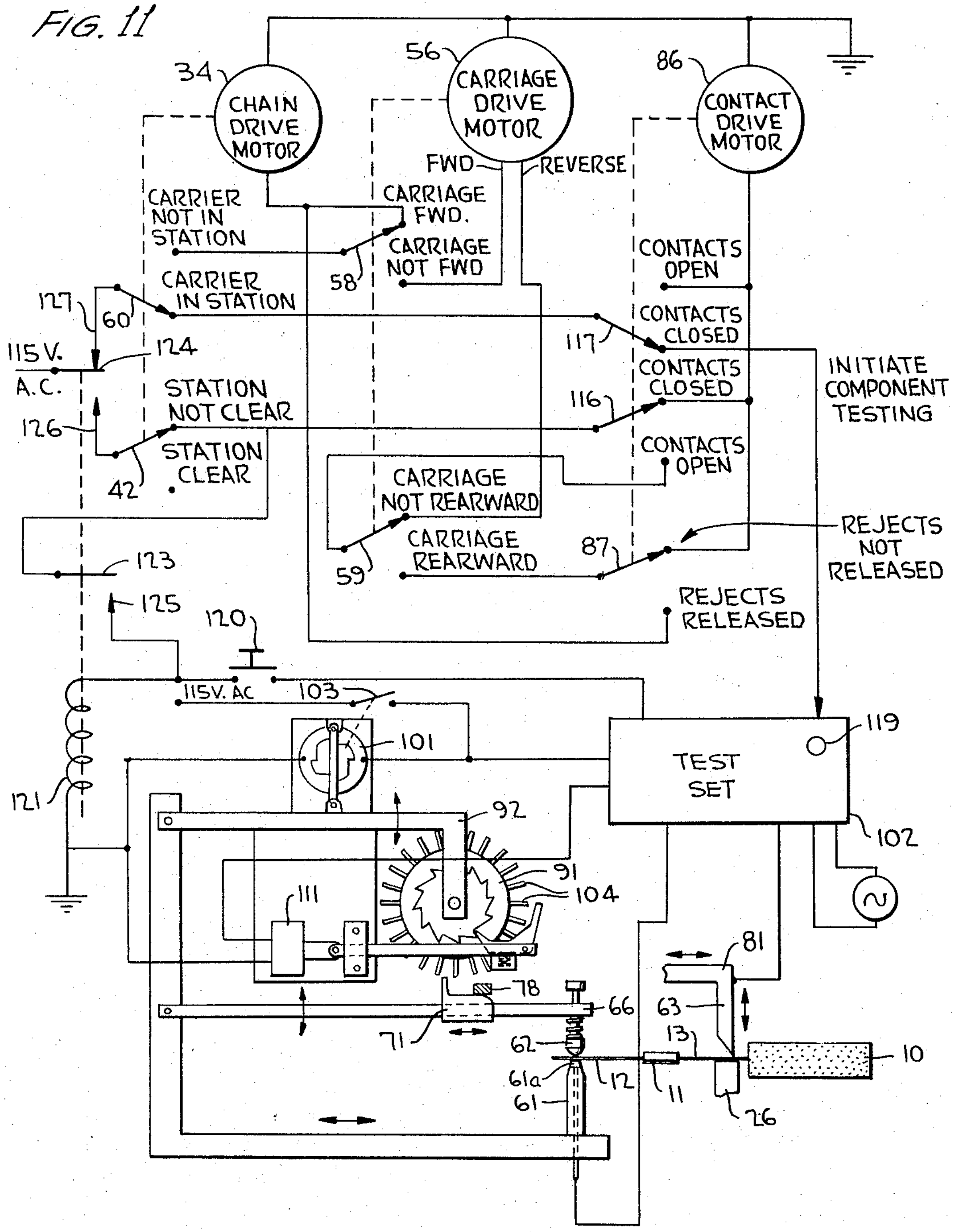
FIG. 11 illustrates the electrical control circuitry for the apparatus of this invention.

If the tested component 11 has acceptable parameter values, a test set 102, FIG. 11, energizes the motor 101 which rotates the cam 99 through an angle of 90 degrees. The cam 99 is designed such that the initial 45-degree angular rotation of the cam 99 operates to lower the link 97 thereby pivoting the frame 92 and the selector drum 91 from an initial elevated and substantially horizontal position to a lower and inclined position. The further 45-degree angular rotation of the cam 99 operates to cam the frame 92 back to the initial position depicted in FIG. 3.

If the tested component is unacceptable, or in other words, if the tested parameter has a value that lies outside of a preselected acceptable range, the test set 102, FIG. 11, does not energize the motor 101 and the selector drum 91 is not lowered. The lobes 100 on the cam 99 are designed to actuate a microswitch 103 which operates through circuitry that will be disclosed in detail subsequently to lock the motor 101 into the energized state during the ninety-degree intervals of cam 99 rotation.

The selector drum 91 is illustrated by FIG. 7 as being helically convoluted. The helical angle traced out by the drum periphery is preferably a function of the transverse or horizontal center-to-center distances between adjacent interposes 71, FIG. 5. With a direct relationship existing between the drum helix and the horizontal distances between adjacent interposes 71, the problem of orienting or positioning a radially projecting drum pin or pin 104 in vertical alignment with an associated interposer 71 is considerably lessened. The number of helically arrayed pins 104 is typically equal to the number of interposers 71 so that each pin 104 is associated with a single interposer. The pins 104 may be threadably connected to the periphery of the drum 91 or may be formed integral therewith.

The selector drum 91 is mounted on a shaft 105 that projects through the frame 92 to provide a mounting for a ratchet wheel 106, FIG. 3. The ratchet wheel 106 is adapted to be advanced by a pawl 107 mounted on a slide rod 108 attached to an armature 109 of a solenoid 111. Upon each actuation of a solenoid 111, the reciprocating pawl 107 advances the ratchet wheel 106 one increment to incrementally rotate the drum 91 in a clockwise direction, as viewed in FIG. 3. The incremental rotation of the drum 91 rotates all the arrayed pins 104 through incremental arcs of angular displacements that are great enough to displace associated individual interposers 71 from engagement with the hold-down bar 78. A pawl 110 is pivotally mounted on the frame 92 and is biased by a coil spring 112 to engage the teeth of the ratchet wheel 104 and prevent rotation of the drum 91 in a counterclockwise direction, as viewed in FIG. 3.

After each component 11 has been tested, the test set 102 is designed to energize the solenoid 111. The solenoid 111 operates to rotate the drum 91 to incrementally rotate the pin 104 corresponding to the tested component from the depending position. Simultaneously, the next pin 104, corresponding to the next component to be tested, is rotated into a depending position with the next interposer 71. When the drum 91 is cammed into the lower position, an incremental rotation of the drum 91 incrementally rotates a pin 104 to engage and drive an associated interposer 71 from between the hold-down bar 78 and the associated lever 66 thereby unlocking and releasing the contact mounting end of the lever 66 for upward pivotal movement. The levers 66 that push upwardly strike the member 83 which stops further upward travel of those levers. If the first pin 104 is not in a position to sweep by or against the first interposer 71, the drum 91 may be manually turned until the desired positional relationship is achieved.

Although the selector drum 91 is described and illustrated as being of circular cross-sectional shape, the drum 91 may also have a noncircular cross-sectional shape. For example, the periphery of the drum might be formed with contiguous incremental chords, and the radial pins 104 might be connected to the drum at the common junctions formed by any two contiguous chords. In addition, although the helically convoluted drum 91 constitutes a preferred embodiment of this invention, the drum might also be solid throughout the entire length of its peripheral surface.

Referring again to FIG. 4, the shaft 76 which is driven by the motor 86 has a cam 115 fixedly mounted thereon. The cam 115 has a lobe 115*a* that successively contacts and depresses a pair of operating arms 116*a* and 117*a* of microswitches 116 and 117, respectively, as the cam 115 rotates. The switches 116 and 117 are mounted on one side plate of the carriage 46 and are actuated in succession by the depression of their operating arms 116*a* and 117*a*, respectively. The function of the switches 116 and 117 as well as the function of the aforedescribed switches 42, 58, 59, 87, and 103 will now be related along with the overall operation of the instant apparatus.

*Operation of apparatus*

Assuming that the carriage 46 is in the forward position, as illustrated in FIG. 3, and that the components 11 in a carrier 14 at station 17 have just been tested by the test set 102, the operator presses a push button 120, FIG. 11, in the test set 102 to initiate a cycle of apparatus operation. An end-of-test indicating lamp 119, FIG. 11, will be illuminated appraising the operator that the testing of the components 11 in the station 17 is finished. The push button 120 closes momentarily to energize a relay 121 in the apparatus control circuit. Then energized relay 121 operates associated switches 123 and 124 to bridge contacts 125 and 126, respectively. The closure of contacts 125 coupled with the closure of contacts 126 locks the relay 121 in the operative state so that the subsequent release of the push button 120 does not de-energize the relay 121. When the operator pushes the push button 120, the circuit (not shown) that supplies current to the lamp 119 opens to extinguish the lamp 119.

The operation of the switch 123 by the relay 121 serves to open contacts 127 of the limit switch 60, thereby disconnecting the 115 volt source from the switch 60. The closure of contacts 126 applies the 115 volt source to the switch 42 which is controlled by the chain drive motor 34, as discussed previously. The switch 42 is in the STATION NOT CLEAR position and the operating arm 42*a*, FIG. 2, will be riding against the outer periphery of the coupling 36 at this time. The cam 115, FIG. 4, is designed to release the operating arm 116*a* of the switch 116 so that the switch 116, FIG. 11, is in the position designated CONTACTS CLOSED. The CONTACTS CLOSED position of the switch 116 corresponds to the aforedescribed condition where the leads 12 and 13 of a component 11 are clamped by the contact pins 62 and the contact bar 63, respectively.

If during the sequential testing of the components 11 a component is determined to be unacceptable by the test set 102, the motor 101 will not be energized and will remain de-energized for the duration of that test. Consequently, the drum 91, FIG. 8, will remain elevated and the pin 104 that corresponds to the unacceptable component will rotate above the extension 71*a* of the corresponding interposer 71 without contacting that extension. This interposer will remain in its initial position between the hold-down bar 78 and the lever 66 that is associated with the unmoved interposer.

Figure 8:
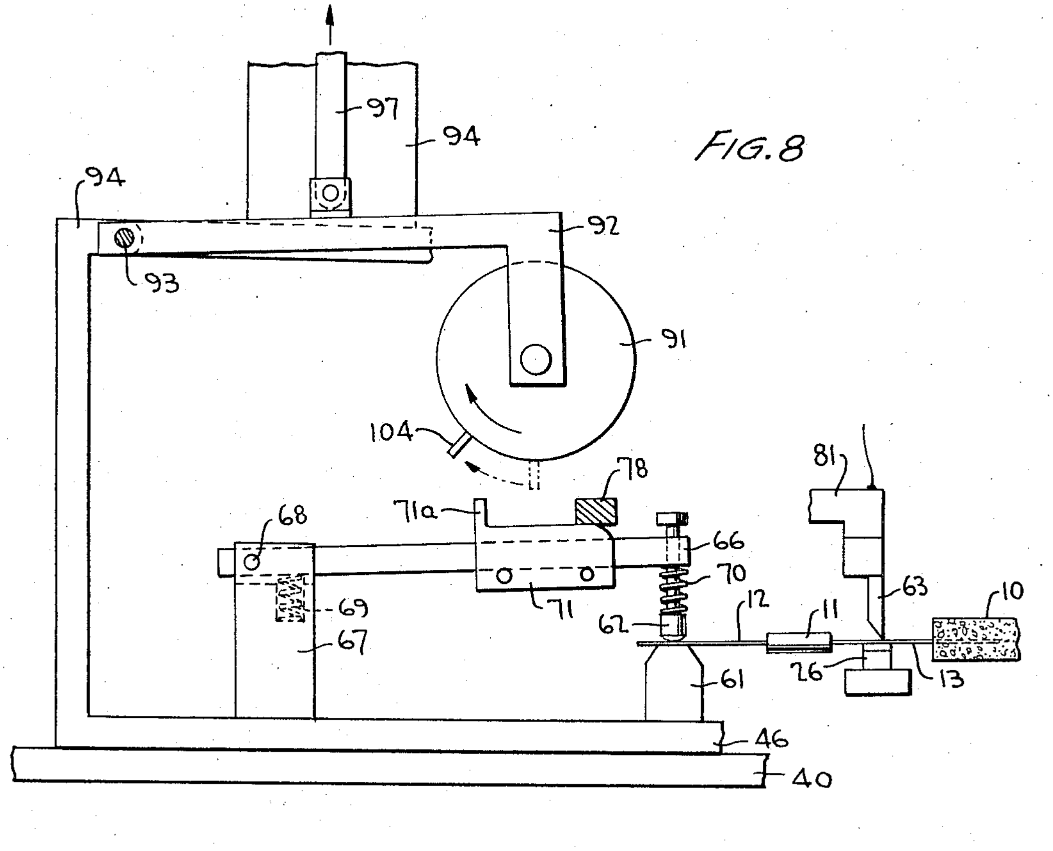
FIG. 8 is a side view of the testing and assorting station showing the selector drum being rotated in an elevated position so that a pin will not engage a corresponding movable member thereby not releasing an unacceptable component.

The test set 102 is internally programmed to energize the solenoid 111 every time a test is performed on a component regardless of the outcome of the test. Consequently, even though the drum 91 is maintained in the elevated position because a particular component is unacceptable, as illustrated in FIG. 8, the solenoid 111 will be energized by the test set 102 to rotate the drum 91, but the depending pin 104 corresponding to the tested component is prevented from removing the corresponding interposer 71 from between the hold-down bar 78 and the lever 66.

When the testing of all the components 11 mounted in the block 10 is completed, the interposers 17 corresponding to the acceptable components have all been moved from between the hold-down bars 78 and the levers 66 and the interposers 71 corresponding to the unacceptable components remain in their originally established positions between the hold-down bar 78 and corresponding levers 66. With the interposers 71 in the latter positions, the associated pins 62 maintain a clamp upon the leads 12 of the unacceptable components.

With the switch 116 in the CONTACTS CLOSED position, the 115 volt source is now connected through the switches 42 and 116 to the motor 86 and the motor 86 thereupon operates under the control of the switch 116 and rotates the cams 77 and 84, FIG. 5. As the cams 84 are rotated to a dwell position, the springs 68 associated with the moved interposers 71 are released to expand and pivot the associated levers 66 and contact pins 62 up and against the cross member 83, FIGS. 4 and 5. The upwardly driven cross member 83 pivots the frame 81 so as to disengage the common contact bar 63 from all of the leads 13 and to release the pins 62 from clamping the leads 12 of the acceptable components 11 against the studs 61*a*.

During this period of shaft 76 rotation by the motor 86, a constant radius section of the cam 77, FIG. 6, contacts the frame 74 and therefore the frame 74 remains practically stationary. The switch 116, FIG. 11, remains in the CONTACTS CLOSED position until the pins 62 and the common contact bar 63 move clear of those components 11 which were tested and found to be acceptable by the test set 102. Thereafter, and upon further rotation of the cam lobe 115, the switch 116 is actuated through its operating arm 116*a* and transfers to the contacts designated CONTACTS OPEN in FIG. 11, and thereupon stops the rotation of the motor 86. When CONTACTS OPEN is bridged by the switch 116, the carriage drive motor 56 is connected through the limit switch 59 to the 115 volt source. The motor 56 drives the carriage 46 rearwardly until the operating arm 59*a* of the switch 59 is actuated by the carriage 46 and moves the switch 59 from the CARRIAGE NOT REARWARD to the CARRIAGE REARWARD position.

When the carriage 46 moves rearwardly, the unacceptable components 11 that are clamped between the pins 62 of the lowered levers 66 and the bars 61 are pulled from the component 11. As the carriage 46 continues to move away from the carrier 14, the vertical leg of the L-shaped rod 55, FIG. 3, engages the depending pin 23 of the comb assembly and pulls the entire carrier comb assembly, including the support rods 19 and 20, outwardly to the extended position as indicated by arrows A in FIG. 10. This outward movement of the comb assembly is synchronized with the withdrawal of the unacceptable components by the pins 62, so that the withdrawn unacceptable components are now supported by their leads 12 and 13 between the combs 21 and 22 and the pad 26, FIG. 10. Since the acceptable components are not withdrawn from the block 10, the leads 12 of these components remain supported by block 10.

Further rotation of the cam 77 to a dwell position causes the spring-biased reciprocable frame 74 to retract and move the release bar 72 into engagement with the interposer extensions 71*a*. The bar 72 operates to slide the interposers 71 associated with the unacceptable components from between the hold-down bar 78 and the lever 66, thereby releasing the grip of the pins 62 on the leads 12 of the withdrawn components 11.

During rearward movement of the frame 74, the operating arm 58*a* of the limit switch 58 is released and the switch 58, FIG. 11, then transfers to the contacts designated CARRIAGE NOT FORWARD, thereby conditioning the carriage drive motor 56 for operation. When the frame 74 reaches the extreme rear position, the operating arm 87*a* of the limit switch 87 is contacted and the switch 87 moved to the position designated REJECTS RELEASED in FIG. 11. With the switch 87 in this position, the motor 86 is de-energized and stops, but voltage is now applied through the contacts of the switch 59 designated CARRIAGE REARWARD to the chain drive motor 34 which drives the chain 33, FIG. 2, until the carrier 14 moves clear of station 17. When the carrier 14 moves to the position designated STATION CLEAR in FIG. 2, the switch 42 is then operated by the operating arm 42*a* dropping into the notch 41 in the member 36.

When the switch 42 is operated, the contacts of switch 42 designated STATION CLEAR in FIG. 11 are bridged, thereby opening the locking circuit for the relay 121. The relay 121, FIG. 11, then releases causing the switch 124 to remake the contacts 127 and causing the switch 123 to reopen. The 115 volt source applies voltage to switch 60 which now bridges contacts designated CARRIER NOT IN STATION 17 by virtue of the carrier 14 having moved clear of station 17 and releasing the operating arm of the switch 60. The carrier drive motor 56 is energized through the closed circuit provided by the switch 60 and the switch 58. It may be recalled that the switch 58 was released by carriage 46 movement to the rear and therefore is now in the CARRIAGE NOW FORWARD position. The energized motor drives the carriage 46 forward until the operating arm 58*a* of the switch 58 is depressed and transfers to the contact designated CARRIAGE FORWARD in FIG. 11. With the switch 58 operated, the chain drive motor 34 is now energized from the 115 volt source causing the chain 33 to translate.

When the next component-loaded carrier 14 moves into the station 17, the switch 60 is actuated to disconnect the 115 volt source from the switch 58 and to apply that voltage to the switch 117 operating under the control of the cam 115, FIG. 4. The cam 115 is now rotated so that the operating arm 117*a* of the switch 117 is depressed by the lobe 115*a* of the cam 115 and closes the contacts designated CONTACTS NOT CLOSED in FIG. 11. With the switch 117 in this position, the motor 86 will be energized to force the interposers 71 under the hold-down bar 78, clamping the pins 62 and the contact bar 63 against the leads 12 and 13, respectively, of the components 11 in the station 17. The bridging of the contacts of the switch 117 designated CONTACTS CLOSED in FIG. 11 causes an initial test voltage signal to be applied to the test set 102 and the test set 102 then proceeds to sequentially test the components 11 in the station 17 the individual paths of current being traced from the test set 102 through the contact bar 63, through the individual components 11 and the individual studs 61*a*. As described hereinabove, the test set 102 is designed to sequentially measure the values of one or more preselected parameters of the components 11 starting with the first selected block 10. After each test is performed by the test set 102, the solenoid 111 is energized by a signal from the test set 102 to index the drum 91 so that the pin 104 that corresponds to the component under test in indexed into a depending relationship with its associated interposer 71.

Figure 9:
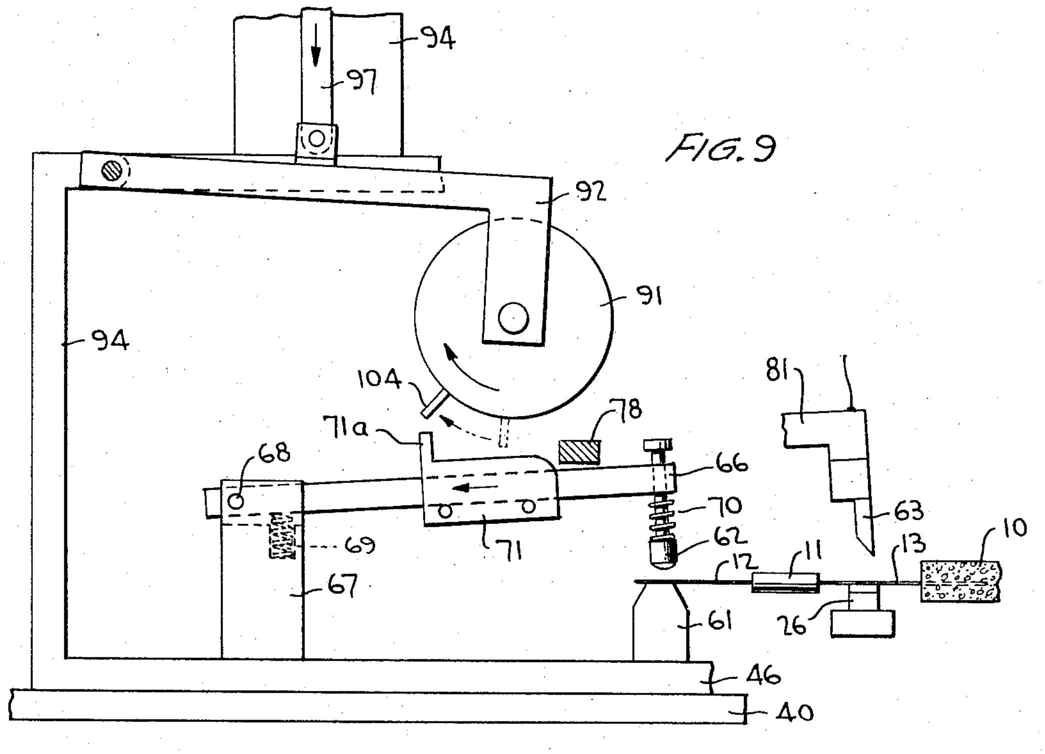
FIG. 9 is a side view of the testing and assorting station showing the selector drum being rotated in a downward position so that a pin will engage a corresponding movable member and move the members from between a hold-down bar and a lever to release an acceptable component.

If the measured component 11 is found to have an acceptable value or values, before the solenoid 111 is energized, the test set 102 will transmit an accept signal to the motor 101 and the motor 101 will be energized by that signal to pivot the drum 91 to the position illustrated by FIG. 9. The subsequent incremental rotation of the drum 91 by the subsequent energization of the solenoid 111 will operate to drive the associated interposers 71 from under the hold-down bar 73, as discussed above, permitting the release of its associated contact 62 from clamping engagement from the terminal 12 of the tested component 11. The switch 103 is operated by the angu'arly displaced cam 99 to lock the motor 101 in the energized state until the frame 92 returns to its initial elevated position.

After each component 11 is tested and the carriage 46 moved rearwardly, those components which have been found to be unacceptable will be withdrawn from the block 10 by their leads 12 that are gripped between associated pins 62 and the bars 61. When the carriage 46 reaches the limit of rearward travel, FIG. 10, the leads 12 of these rejected components will rest upon the comb 21 and the leads 13 will be loosely supported by the pad 26. After the end-of-test lamp 119 illuminates and the operator again presses the push button 120 to advance the carrier 14 from station 17 to the STATION CLEAR position, FIG. 2, the unacceptable components 11 fall by gravity from the carrier 14 to an area on the base 40 proximate the sprocket 38. The unacceptable components may be removed by the operator from this area or a chute (not shown) may be provided to receive and remove the components that fall from the carrier. When the carrier 14 reaches the STATION CLEAR position of FIG. 2, the operator may depress the roller 28 of the lever 27 so that the tested block 10 with the acceptable components thereon drops by gravity out of the nest 18 of the carrier 14. A fixed cam (not shown) may be provided as an alternate means to depress the roller 18 when the carriage advances to the STATION CLEAR position.

The unacceptable components that have been withdrawn from the block 19 may be replaced by components which are known to be acceptable, or the block 10 with new components inserted therein may be reinserted into the carrier and tested again. As the unloaded carrier 14 returns to the station 16 for loading with another block of components, the camming edge 24 of the stationary cam 25, FIG. 2, will engage the pin 23 that depends from the comb assembly and drive the comb assembly inwardly, thereby resetting the combs 21 and 22 to support the leads 12, extending from another block 10. The nest 18 in the carrier 14 will be opened by the roller 28 riding upon the surface of the frustoconical cam 29 or alternatively, by a roller-depressing solenoid (not shown) under the control of a foot-operated switch (not shown).

It is believed that the operation of the above-described invention will be apparent from the foregoing description, and it is obvious that various changes and modifications may be made therein without departing from the spirit and scope of the invention. For example, the drum 91 may be utilized to selectively close a plurality of contacts or to selectively operate a plurality of other devices when the auxiliary drum circuitry receives two substantially coincidental signals.

What is claimed is:

1. An apparatus for selectively withdrawing articles from an article holder comprising, a plurality of clamping means selectively movable to grip and release the articles, means for biasing said clamping means to release the articles, stop means spaced from said clamping means for restraining the release of the articles by the biasing means, a plurality of discrete elements mounted on said clamping means and movable between said clamping means and said stop means for maintaining said clamping means in gripping relationship with the articles against the bias offered by said biasing means, a selector mechanism for moving selected of said elements from between said clamping means and said stop means for rendering effective said biasing means to move said clamping means and release correspondingly gripped articles, and means for moving said clamping means from said holder to withdraw articles held gripped by said clamping means from said holder.

2. An apparatus for sorting components in accordance with the results of at least one test performed on each component, the apparatus comprising, at least one device movable to selectively grip and release at least one of the components associated with said one device, means for biasing said one device to release the components, at least one interposer slidably mounted on said one device and operable to engage and hold said one device against release by the biasing means, means for performing a predetermined test on the gripped components, the testing means generating an output signal when a component is acceptable, at least one pin mounted for pivotal and rotary movement about different respective axes, said one pin being associated with said one interposer, means connected to the test performing means and operable in response to the output signal therefrom for pivoting said one pin into alignment with said one interposer, means for rotating said pin to engage and move the said one interposer and causing said biasing means to release said one device and the component gripped thereby, and means operated upon completion of the rotation of said one pin for moving said one device from the released component.

3. An apparatus for selectively withdrawing certain components from a component carrier, comprising, a plurality of movably mounted elements for selectively clamping and releasing the components, each of the components having one of said elements associated therewith, resilient means for biasing said elements to release the components.

a stop common to all of said elements and spaced therefrom for holding said elements against component release by said resilient means, plural members individually interposed between corresponding elements and said stop for maintaining the individual elements in clamping engagement with individual components, a selector mechanism for selectively moving certain of said members from engagement with said stop to release corresponding elements when the associated components are acceptable, means for driving all of said elements from the carrier to withdraw the unreleased components from the carrier.

4. The apparatus as claimed in claim 3 wherein said selector mechanism comprises, a drum having an axis of rotation and pivotal axis parallel to said axis of rotation, plural pins projecting from the surface of said drum and arranged in an essentially helical array of pins on said drum surface, said pins successively engaging individual interposed members when said drum is pivoted and incrementally rotated,
means for rotating said drum incrementally, and
means for selectively pivoting said drum prior to the incremental rotation thereof, when the component is considered acceptable.

5. An apparatus for removing unacceptable electrical components from a component carrier comprising,
a plurality of pivotally mounted elements for selectively clamping and releasing the components, each element initially clamping an associated individual component,
resilient means for biasing said elements to release the components,
a hold-down bar overlying said elements for initially holding said elements against component release by said resilient means,
a plurality of movable interposers positioned between said elements and said hold-down bar for holding the individual elements in a clamping relationship with associated individual components,
a plurality of contacts in substantial alignment with said elements for making electrical contact with each of the components clamped by said elements,
a test set having input terminals connected to said elements and operative subsequently to the clamping of the components by said elements against said contacts for measuring the components sequentially, said test set generating a first signal when a measured component parameter falls within predetermined limits and thereafter generating a second signal after each component is measured,
a rotatable drum having a plurality of extending pins arranged to sequentially engage and drive the individual interposers from engagement with said hold-down bar,
means for pivotally mounting said drum to selectively pivot individual pins into positions to move the individual interposers,
means connected to said test set and responsive to the second signal therefrom for incrementally rotating said drum,
means connected to said test set and responsive to the first signal therefrom for pivoting said drum to a position where one of said pins is aligned with its corresponding interposer, the one pin that is associated with the acceptable component under test driving the associated interposer from engagement with said hold-down bar when said drum is rotated incrementally, whereupon the associated element is displaced by said resilient means to release the acceptable component, and
means for moving all of said elements from said carrier so that the unreleased elements withdraw the unacceptable components from the carrier.

6. An apparatus for sorting a plurality of electrical components in accordance with the result of at least one test performed on each component, each component including first and second leads, the apparatus comprising,
a carriage mounted for forward and reverse movement,
reversible drive means connected to said carriage for imparting forward and reverse movement thereto,
means for mounting the components with the leads thereto substantially parallel,
plural contacts mounted on the forward end of said carriage for supporting and making electrical contact with the first lead of each component,
means for indexing the component mounting means to a position adjacent the forward end of said carriage,
a plurality of parallel levers pivotally mounted on said carriage each lever having a free end that extends toward and adjacent an associated component, an element mounted on each of said levers for movement toward and away from the contacts to respectively clamp and release the first lead of each component,
means for biasing the free ends of said levers and the elements from said components,
a hold-down bar mounted on said carriage in transverse overlying relationship to the free ends of said levers,
a plurality of interposers individually mounted for slidable movement on one of said levers to a position between said bar and an associated lever to lock said elements in clamping relationship with the first component leads and said contacts,
a pivotably mounted frame mounted on said carriage for engaging and pivoting said levers toward the components,
a contact bar mounted forwardly on said frame and positioned to make electrical contact with the second leads of the components,
a first cam mounted on said frame for pivoting said levers until electrical contact is effected between the second leads and said contact bar and between the first leads and said contacts,
a second cam mounted on said frame and operatively connected to said first cam for moving said interposers between said levers and said hold-down bar,
a test set including plural input terminals selectively connected to each of said contacts and to said common contact bar for successively testing each component mounted in said component mounting means, said test set producing a first output signal if the tested components is acceptable, and a second subsequent output signal,
a drum mounted for rotary and pivotal movement about parallel axes, said drum having a plurality of pins extending radially therefrom and oriented in a helical array on the periphery thereof, the lateral distances between adjacent pins being substantially equal to the lateral distances between adjacent components and the pins being in substantial alignment with said interposers,
first drive means connected to receive the first output signal from said test set and operating in response thereto to pivot said drum so that one of said pins is moved into alignment with one of said interposers that corresponds to the acceptable component under test,
second drive means connected to receive the second output signal from said test set and operable in response thereto to rotate said drum so that said one pin drives said one interposer from between an associated lever and said hold-down bar thereby releasing said acceptable component under test, and
reversible drive means connected to said test set and operated thereby at the completion of the testing of all components on the component mounting means to drive said carriage in reverse, so that the unreleased contacts withdraw unacceptable components from said component mounting means.

7. In a device for displacing a plurality of movable members,
a plurality of radially disposed pins mounted for pivotal and rotary movements about parallel axes, each pin being in substantial alignment with a movable member,
means for pivoting said pins to move one of said pins to a position adjacent and in alignment with one of said movable members, and
means for incrementally rotating all of said pins so that the one pin engages and displaces the one movable member.

8. The device as claimed in claim 7, wherein said pins are disposed in a helical array about the axis of rotation thereof.

9. The device as claimed in claim 8, wherein a helically convoluted support is provided for mounting said pins and wherein said pins are mounted on the peripheral surface of the support.

References Cited

UNITED STATES PATENTS 3,240,333 3/1966 Boyd et al. ---------- 209—81

ALLEN N. KNOWLES, *Primary Examiner.*